(12) United States Patent
Stewart

(10) Patent No.: US 8,555,883 B2
(45) Date of Patent: Oct. 15, 2013

(54) EMERGENCY BREATHING BAG

(76) Inventor: Robert E. Stewart, Old Barns (CA)

( * ) Notice: Subject to any disclaimer, the term of this patent is extended or adjusted under 35 U.S.C. 154(b) by 1023 days.

(21) Appl. No.: 12/588,744

(22) Filed: Oct. 27, 2009

(65) Prior Publication Data

US 2010/0116275 A1    May 13, 2010

Related U.S. Application Data

(60) Provisional application No. 61/193,227, filed on Nov. 7, 2008.

(51) Int. Cl.
*A62B 7/10* (2006.01)
*A61M 16/22* (2006.01)

(52) U.S. Cl.
USPC ............ 128/205.17; 128/205.28; 128/205.22; 128/205.12

(58) Field of Classification Search
USPC ............. 128/201.13, 201.25, 201.26, 201.27, 128/202.14, 202.26, 204.15, 205.12, 128/205.13, 205.17, 205.22, 205.27, 205.28
See application file for complete search history.

(56) References Cited

U.S. PATENT DOCUMENTS

| | | | |
|---|---|---|---|
| 896,447 A | | 8/1908 | Hall et al. |
| 1,878,474 A | * | 9/1932 | Drager et al. ............ 128/202.14 |
| 2,403,981 A | * | 7/1946 | Jackson et al. ............ 128/202.26 |
| 2,456,130 A | * | 12/1948 | Lambertsen ............ 128/202.19 |
| 3,877,425 A | * | 4/1975 | O'Neill ..................... 128/202.19 |
| 4,154,234 A | | 5/1979 | Baker |
| 4,164,218 A | | 8/1979 | Martin |
| 4,213,453 A | * | 7/1980 | Warncke et al. .......... 128/202.26 |
| 4,324,234 A | * | 4/1982 | Maness ..................... 128/202.14 |
| 4,362,153 A | | 12/1982 | Wilson et al. |
| 4,512,610 A | | 4/1985 | Gilbert et al. |
| 4,586,500 A | | 5/1986 | Glynn |
| 4,794,923 A | | 1/1989 | Bartos |
| 4,817,597 A | * | 4/1989 | Tanaka ..................... 128/205.17 |
| 4,821,711 A | | 4/1989 | Eckstein et al. |
| 4,879,996 A | | 11/1989 | Harwood, Jr. |

(Continued)

FOREIGN PATENT DOCUMENTS

| | | |
|---|---|---|
| CA | 713356 | 7/1965 |
| CA | 787696 | 6/1968 |

(Continued)

OTHER PUBLICATIONS

Confined Spaces: Managing Unseen Hazards; by Dave Kuiawa, Published in 2005 by Compliance Magazine, Douglas Publications, LLC.

*Primary Examiner* — Justine Yu
*Assistant Examiner* — Valerie L Skorupa
(74) *Attorney, Agent, or Firm* — Mario Theriault

(57) ABSTRACT

The breathing bag has an upper region; a lower region; a conduit for delivering exhaled air to the lower region and a conduit for withdrawing breathable air from the upper region. The device also has a baffle mounted therein for entrapping exhaled air in the lower region and for causing the exhaled air to remain in a low turbulence mode, for promoting a separation of oxygen and carbon dioxide from the exhaust air by stratification and for causing carbon dioxide to accumulate in the lower region of the bag. Consequently, the breathable air rising from the lower region of the bag has a higher oxygen content. In another aspect of the invention, a method for separating carbon dioxide and oxygen by stratification from exhaled air is also described.

11 Claims, 2 Drawing Sheets

(56) References Cited

U.S. PATENT DOCUMENTS

| | | |
|---|---|---|
| 4,917,081 A | 4/1990 | Bartos |
| 4,938,211 A | 7/1990 | Takahashi et al. |
| 5,036,841 A * | 8/1991 | Hamilton ............... 128/202.26 |
| 5,165,394 A | 11/1992 | Hochberg |
| 5,499,623 A * | 3/1996 | Pasternack ............. 128/201.21 |
| 5,720,279 A | 2/1998 | Furuichi et al. |
| 5,724,958 A | 3/1998 | Farnworth et al. |
| 6,279,571 B1 | 8/2001 | Meckes |
| 6,761,162 B1 | 7/2004 | Swann |
| 7,028,687 B1 | 4/2006 | Silver et al. |
| 7,047,966 B2 | 5/2006 | Stewart |

FOREIGN PATENT DOCUMENTS

| | | |
|---|---|---|
| CA | 1020840 | 11/1977 |
| CA | 2024439 | 3/1991 |
| CA | 2072226 | 8/1993 |
| DE | 41 37 331 | 5/1993 |

\* cited by examiner

EMERGENCY BREATHING BAG

This application claims the benefit of U.S. Provisional Application No. 61/193,227 filed Nov. 7, 2008.

FIELD OF THE INVENTION

This invention pertains to a breathing bag having baffles mounted at the lower end of the bag, for causing exhaled air to remain in a still mode inside the bag and for separating oxygen and carbon dioxide from exhaled air by stratification, thereby reducing the carbon dioxide content in re-breathable air rising to the upper portion of the bag.

BACKGROUND OF THE INVENTION

A breathing bag is used as a breathing aid in the presence of smoke or toxic fumes, for getting out of a house on fire, for example. A high pressure cylinder of oxygen may be attached to the bag to provide oxygen for a limited period of time. Whether an oxygen cylinder is provided or not, exhaled air contains a substantial amount of oxygen, and it is possible to re-breathe exhaled air several times in an emergency situation.

It is known that ambient air contains about 21% oxygen. It is also known that a recommended minimum oxygen content in breathable air is about 15%, because a lower amount could cause hallucinations. It is further known that a person breathing normally consumes about 5% of the oxygen present in ambient air, while a person hyperventilating in a panic situation absorbs only about 3%. Therefore, it is believed that in many circumstances, the air exhaled into a breathing bag still contains oxygen and can be re-breathed again. When the breathable gas in the high pressure cylinder is a mixture of gas rich in oxygen, such as 90% oxygen for example, this gas can be re-breathed several times before it reaches the 15% lower limit.

Several types of closed-circuit breathing bags can be found in the prior art. Examples of the prior art breathing devices are described in the following documents:

U.S. Pat. No. 896,447 issued to S. S. Hall et al. on Aug. 18, 1908;
U.S. Pat. No. 4,154,234 issued to R. L. Baker on May 15, 1979;
U.S. Pat. No. 4,164,218 issued to F. E. Martin on Aug. 14, 1979;
U.S. Pat. No. 4,362,153 issued to J. G. Wilson et al., on Dec. 7, 1982;
U.S. Pat. No. 4,586,500 issued to M. H. Glynn on May 6, 1986;
U.S. Pat. No. 4,794,923 issued to J. A. Bartos on Jan. 3, 1989;
U.S. Pat. No. 4,817,597 issued to S. Tanaka on Apr. 4, 1989;
U.S. Pat. No. 4,821,711 issued to W. Eckstein et al., on Apr. 18, 1989;
U.S. Pat. No. 4,879,996 issued to V. H. Harwood, Jr. et al., on Nov. 14, 1989;
U.S. Pat. No. 4,917,081 issued to J. A. Bartos on Apr. 17, 1990;
U.S. Pat. No. 4,938,211 issued to M. Takahashi et al., on Jul. 3, 1990;
U.S. Pat. No. 5,165,394 issued to J. Hochberg on Nov. 24, 1992;
U.S. Pat. No. 5,720,279 issued to Y. Furuichi et al., on Feb. 24, 1998;
U.S. Pat. No. 5,724,958 issued to B. Farnworth et al., on Mar. 10, 1998;
U.S. Pat. No. 6,279,571 issued to R. Meckes on Aug. 28, 2001;
U.S. Pat. No. 6,761,162 issued to L. J. Swann on Jul. 13, 2004;
U.S. Pat. No. 7,028,687 issued to M. Silver et al., on Apr. 18, 2006;
CA Patent 713,356 issued to I. Streimer on Jul. 13, 1965;
CA Patent 787,696 issued to L. R. Phillips on Jun. 18, 1968;
CA Patent 1,020,840 issued to L. Yi-Sheng et al., on Nov. 15, 1977;
CA Patent Appl. 2,024,439 filed by F. W. Arnoth, on Aug. 31, 1991; This application was published on Mar. 2, 1991;

The apparatus of the prior art are presented herein only to show the state of the art in the field of the invention. These apparatus are characterized in that they have either a carbon dioxide scrubber mounted therein between an exhaled air compartment and a breathable air compartment, or an oxygen-generating canister therein, in which carbon dioxide and moisture in exhaled air enter into a chemical reaction with the content of the canister to produce oxygen.

At least one breathing bag of the prior art has the option to re-breath the content of the bag several times. This breathing bag is described in a patent granted to the inventor of the present emergency breathing bag. This patent is identified as follows:

U.S. Pat. No. 7,047,966 issued to Robert E. Stewart on May 23, 2006.

While the apparatus of the prior art have their own merits, the prior art literature in the field of breathing devices does not disclose the possibility of purifying re-breathable gas by stratification in a breathing device. Stratification of gases is well known in the mining industry for example, as explained in:

U.S. Pat. No. 4,512,610 issued to Clark J. Gilbert et al. on Apr. 23, 1985. This document discloses the fact that blowers are used in mines to prevent stratification of gases in the mine atmosphere.

Although the phenomenon of separating gases by stratification is known generally, the prior art is silent concerning the possibility of purifying air by stratification in a breathing apparatus for increasing the quality of re-breathable air in that apparatus.

SUMMARY OF THE INVENTION

In the present invention, there is provided a breathing bag that has baffles therein for promoting the separation of oxygen and carbon dioxide in exhaled air, by stratification. The oxygen-rich air is thereby separated from the exhaled air and it is selectively entrained in the re-breathable air to increase the oxygen content of the re-breathable air.

More specifically, there is provided a breathing bag having an upper region; a lower region; a conduit for delivering exhaled air in the lower region and a conduit for withdrawing breathable air from the upper region. The device also has a baffle mounted therein for entrapping exhaled air in the lower region and for causing the exhaled air to remain in a low turbulence mode for promoting a separation of oxygen and carbon dioxide from the exhaled air by stratification, and for causing carbon dioxide to accumulate in the lower region. Consequently, the breathable air rising to the upper portion of the bag has a better quality.

In another aspect of the present invention, there is provided a method for purifying exhaled air in a breathing device, comprising the steps of;
a) providing a compartment in a breathing device and a baffle mounted in a lower region of that compartment;

b) delivering exhaled air in a lower region of that compartment below the baffle means;
c) slowing down a passage of the exhaled air from the lower region through the baffle means;
d) causing the exhaled air to separate by stratification in the lower region, into an oxygen-rich portion and a carbon dioxide portion;
e) causing the oxygen-rich portion to rise to an upper region of the compartment; and
f) withdrawing the oxygen-rich portion from the upper region of the compartment.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the present invention is illustrated in the accompanying drawings in which like numerals denote like parts throughout the several views, and in which.

DESCRIPTION OF THE PREFERRED EMBODIMENT

Figure 1:
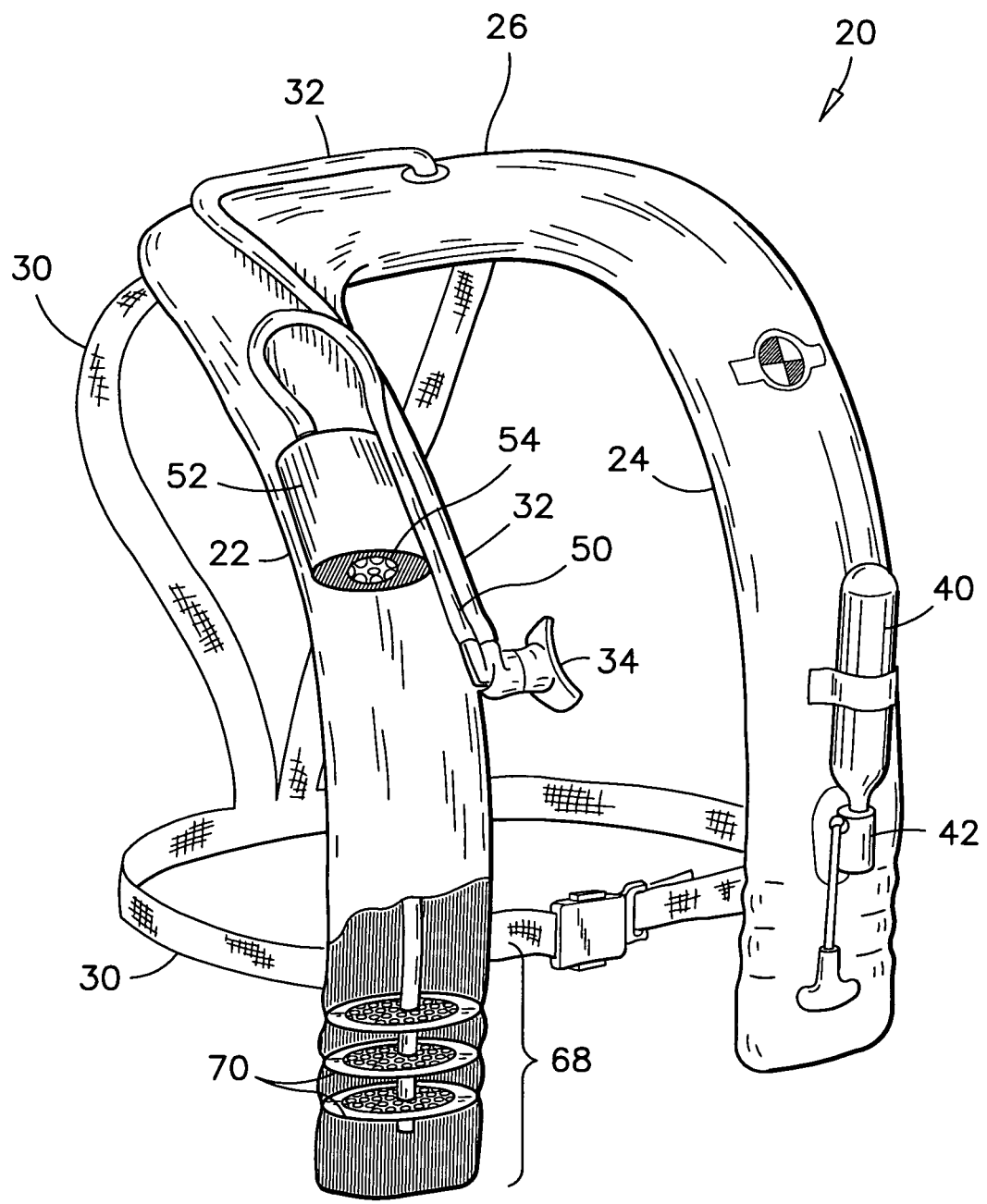
FIG. 1 is a perspective front and side view of the preferred emergency breathing bag according to a preferred embodiment of the present invention.
Figure 2:
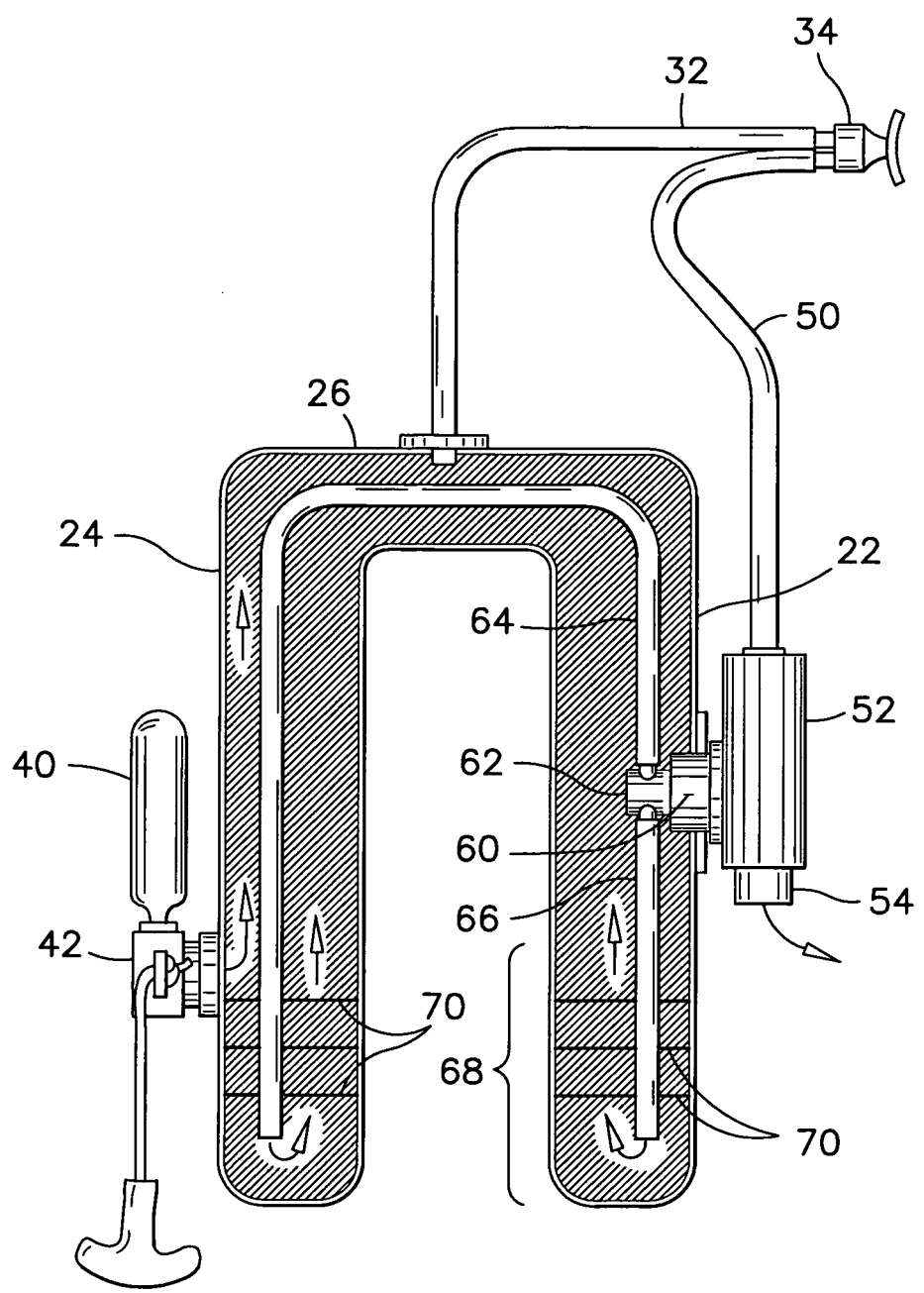
FIG. 2 is a schematic illustration of the preferred emergency breathing bag.

Referring to FIGS. 1 and 2 simultaneously, the preferred emergency breathing bag 20 will be described. The preferred breathing bag 20 has an inverted U-shape with two leg portions 22, 24 and an upper connector 26 joining the leg portions 22, 24 together. A harness 30 is preferably affixed to the preferred breathing bag 20, for wearing the emergency breathing bag 20 comfortably, around one's neck for example with each leg portion 22, 24 laid downward on the wearer's torso.

The preferred emergency breathing bag 20 contains a reserve of breathable air. This breathable air is passed on to the user by way of an outlet hose 32 connected to a mouthpiece 34. The outlet hose 32 is connected to the upper connector 26, at the highest portion of the breathing bag 20.

A cylinder 40 of oxygen under pressure is preferably provided on the emergency breathing bag 20. This cylinder of oxygen 40 is preferably mounted at an intermediate position along leg portion 24 for example. The preferred cylinder of oxygen 40 has a seal-puncturing operator 42. This operator is referred to by some manufacturers as an inflator. The preferred inflator 42 is operable by pulling on a handle which is tied to the inflator's mechanism by a string. The preferred inflator 42 is available from Halkey-Roberts™, a manufacturer located in St-Petersburg, Fla., USA.

The preferred oxygen cylinder 40 can be of any convenient size and pressure. The operator 42 preferably has a low flow rating, or is modified to release oxygen at a low flow. In that respect, a slow flow rate of about 3.5 liters per minute is suggested for most emergency applications, but other flow rates may also work depending on the intended use of the emergency breathing bag 20.

The air exhaled by the user is forced from the mouthpiece 34 into an exhaled air hose 50 and into a carbon dioxide absorbing canister 52. The content of this canister is not provided herein because it is not the focus of the present invention, and it is generally well known in the field of breathing devices. One such supplier of carbon dioxide absorber is Micropore Inc. located at 350F Pencader Drive, Newark, Del., USA, 19702. This carbon dioxide absorber is identified under the trademark of ExtendAir™.

The preferred carbon dioxide absorbing canister 52 has an outlet port 54 and a relief valve (not shown) on that port. Excess pressure buildup on that port is vented outside the bag 20 through the outlet port 54. Excess pressure is defined as slightly above atmospheric pressure. Although a carbon dioxide absorbing canister 52 is described herein, a filtering device for filtering and recovering oxygen from carbon dioxide may also be used in the preferred emergency breathing bag 20.

The air inlet hose 32, the mouthpiece 34 and the exhaled air hose 50 have one or more one-way valves therein to control the flow of air there through. These one-way valves are not illustrated herein and are not described in details because they are not the focus of the present invention.

Referring particularly to FIG. 2, the flow path of air inside the emergency breathing bag 20 is illustrated. The cross-hatching or shaded area in FIG. 2 represents the inside region of the emergency breathing bag 20. The arrows in the cross-hatching represent the flow of gases inside the emergency breathing bag 20.

The oxygen from the pressurized cylinder 40 is released into the leg portion 24 of the emergency breathing bag and accumulates in the upper connector 26. This oxygen is inhaled by the user through the inlet hose 32 and the mouthpiece 34.

The exhaled air is passed through the exhaled air hose 50 and into the carbon dioxide absorbing canister 52. The excess exhaled air is expelled through the outlet port 54 and the relief valve of the carbon dioxide absorbing canister 52.

The exhaled air passing through the carbon dioxide absorbing canister 52, is purified and is forced through a filter 60 and into a T-connector 62 to which is connected two exhaled air distribution hoses 64, 66. The purpose of the filter 60 is to remove any particles from the exhaled air, such as crystals forming through the material inside the carbon dioxide absorbing canister 52.

The filtered exhaled air is delivered through the distribution hoses 64, 66 to the lower compartments 68 of both leg portions 22, 24 of the emergency breathing bag 20, below a series of spaced-apart baffles 70 in these lower compartments 68. These baffles 70 have perforations therein as better seen in FIG. 1, to let exhaled air migrate upward there through slowly.

The baffles 70 are preferably made of a perforated flexible membrane material that is bonded to the walls of each lower compartment 68. One may also use baffles 70 made of stiff material, supported by spacers extending from the bottom end of each lower compartment 68. The material of the baffles 70 and the way these baffles are mounted inside the lower compartments 68 are not the focus of the present invention. It is the function of these baffles 70 that is of interest herein.

The function of the perforated baffles 70 is to entrap and to retain exhaled air in the lower compartments 68 of both leg portions 22, 24 as long as possible in a still mode to promote the stratification of the exhaled air. Carbon dioxide is heavier than oxygen, and therefore has a tendency to sink and to separate from the oxygen content in the exhaled air.

It will be appreciated that means other than a perforated baffle 70 can be used to reduce the turbulence and velocity of the air moving in the lower regions of the breathing bag 20. It is believed that a series of fins along the side walls of both leg portions 22, 24, or a porous, sponge-like material mounted in the lower compartments 68 might also work as good as the perforated baffles 70. For this reason, the baffles 70 are referred to as baffle means 70, and the expression should be understood as encompassing all flow-restrictive devices or material to retain air in a still mode in the leg portions of the emergency breathing bag 20. Although three baffles 70 have been illustrated in the drawings, these drawings should not be restrictive. More or less than three baffles 70 can work. Similarly, each lower compartment 68 may be longer or shorter than the proportion shown in the drawings.

A secondary advantage of the baffles 70 is their ability to dissipate heat generated by the separation of oxygen and carbon dioxide in the carbon dioxide absorbing canister 52. The breathable air inside the bag 20 is therefore cooler than the air in another breathing bag without baffle.

The breathable air inside the emergency breathing bag 20 is also cooler than in other breathing bag because of the fact that portions of the carbon dioxide and heat in exhaled air are released through the relief valve 54 of the carbon dioxide absorbing canister 52.

In use, the emergency breathing bag is worn by a user, and the operator 42 on the oxygen cylinder 40 is activated. Oxygen is delivered slowly into the emergency breathing bag 20, and carbon dioxide is expelled through the relief valve 54 of the carbon dioxide canister 52 at about the same flow rate as the supply of oxygen from the oxygen cylinder 40 and operator 42. When the oxygen cylinder 40 is empty there should be no more flow through the relief valve 54. The exhaled air is simply circulated through the mouthpiece 34, through the carbon dioxide absorbing canister 52 and back into the emergency breathing bag 20 to be re-breathed again.

Because of the structure of the emergency breathing bag 20 and the baffle means 70, the exhaled air rising to the upper connector 26 and available for re-breathing has a higher oxygen content than other breathing devices where exhaled air is re-breathed directly.

While two leg portions 22, 24 are illustrated and described herein, it is possible to use only one rectangular bag having a longer vertical dimension, wherein the air rising toward the mouth piece of the breathing device has its carbon dioxide content partly reduced by stratification. Similarly, it is possible to used three or more compartments mounted in series to obtain three or more separation phases.

It should also be considered that the carbon dioxide absorbing canister 52 is not essential in the preferred breathing bag 20. For example, one may consider to modify the pillow-shaped breathing bag described and illustrated in Applicant's previous U.S. Pat. No. 7,047,966, with added baffles and exhaled air distribution hoses to obtain the benefits of separating carbon dioxide from exhaled air in a breathing device.

Furthermore, it should also be understood that the oxygen cylinder 40 is not essential in the preferred breathing bag 20. A user of the breathing bag 20 may partly inflate the breathing bag by mouth prior to use, and re-breathe the same air several times.

And of course, the harness 30 is not essential for providing no contribution to the purification of the breathable air inside the preferred emergency breathing bag 20.

What is claimed is:

1. An emergency breathing bag containing breathable air and comprising;
    an inverted U-shaped configuration with two leg portions and an upper connector joining said leg portions; said upper connector having a mouthpiece connected thereto; each of said leg portions including;
    an upper region; a lower region; and an elongated intermediate segment extending between said lower region and said upper region;
    a passage for delivering exhaled air from said mouthpiece and into said lower region;
    a baffle mounted in said lower region for causing said exhaled air to be restrained in a still mode in said lower region, for promoting a separation of carbon dioxide and oxygen from said exhaled air by stratification, and;
    each of said leg portions, and a connection of each of said leg portions to said upper connector having a same and uniform hollow cross-section there along, for allowing said oxygen from said exhaled air to rise to said upper connector with reduced turbulence.

2. The emergency breathing bag as claimed in claim 1, wherein said passages for delivering exhaled air in said lower regions comprise a carbon dioxide absorbing canister for removing a portion of carbon dioxide from said exhaled air.

3. The emergency breathing bag as claimed in claim 2, wherein said carbon dioxide absorbing canister has a relief valve and an outlet port for releasing excess pressure therefrom.

4. The emergency breathing bag as claimed in claim 3, wherein said relief valve is set at a pressure that is slightly above atmospheric pressure.

5. The emergency breathing bag as claimed in claim 1, wherein said passages for delivering exhaled air in said lower regions comprise exhaled air distribution hoses extending below said baffles and into said lower regions.

6. The emergency breathing bag as claimed in claim 1, further comprising a cylinder of oxygen under pressure connected thereto for delivering oxygen therein.

7. A breathing bag containing breathable air and having;
    a mouthpiece;
    an inverted U-shaped bag having two spaced apart leg portions extending vertically and an upper connector extending horizontally and connecting said leg portions together; each of said leg portions having a lower region and an elongated intermediate segment extending between said lower region and said upper connector;
    exhaled air hoses connected to said inverted U-shaped bag and to said mouthpiece for delivering exhaled air in said lower regions;
    an outlet hose connected to said upper connector and to said mouthpiece for withdrawing said breathable air therefrom;
    a baffle mounted in each of said leg portions in said lower regions for causing said exhaled air to be restrained in a still mode in said lower regions for promoting a separation of carbon dioxide and oxygen from said exhaust air by stratification and
    each of said leg portions and a connection of each of said leg portions to said upper connector having a same and uniform hollow cross-section there along for allowing said oxygen from said exhaled air to rise to said upper connector with reduced turbulence.

8. The breathing bag as claimed in claim 7, wherein said exhaled air hoses extend below said baffles.

9. The breathing bag as claimed in claim 8, further comprising a cylinder of oxygen under pressure connected to one of said leg portions for delivering oxygen in said one leg portion, and a carbon dioxide absorbing canister connected to another one of said leg portions for removing carbon dioxide from said exhaled air hoses.

10. The breathing bag as claimed in claim 9, wherein said carbon dioxide canister has a relief valve therein for releasing excess pressure therein.

11. The breathing bag as claimed in claim 10, further comprising a harness for retaining said inverted U-shaped bag around a user's neck with said leg portions extending downward over said user's torso.

* * * * *